Dec. 31, 1968   J. J. FRY   3,418,957
DESIGN AND CONSTRUCTION OF HULLS FOR MARINE CRAFT
Filed Dec. 21, 1966   Sheet 1 of 5
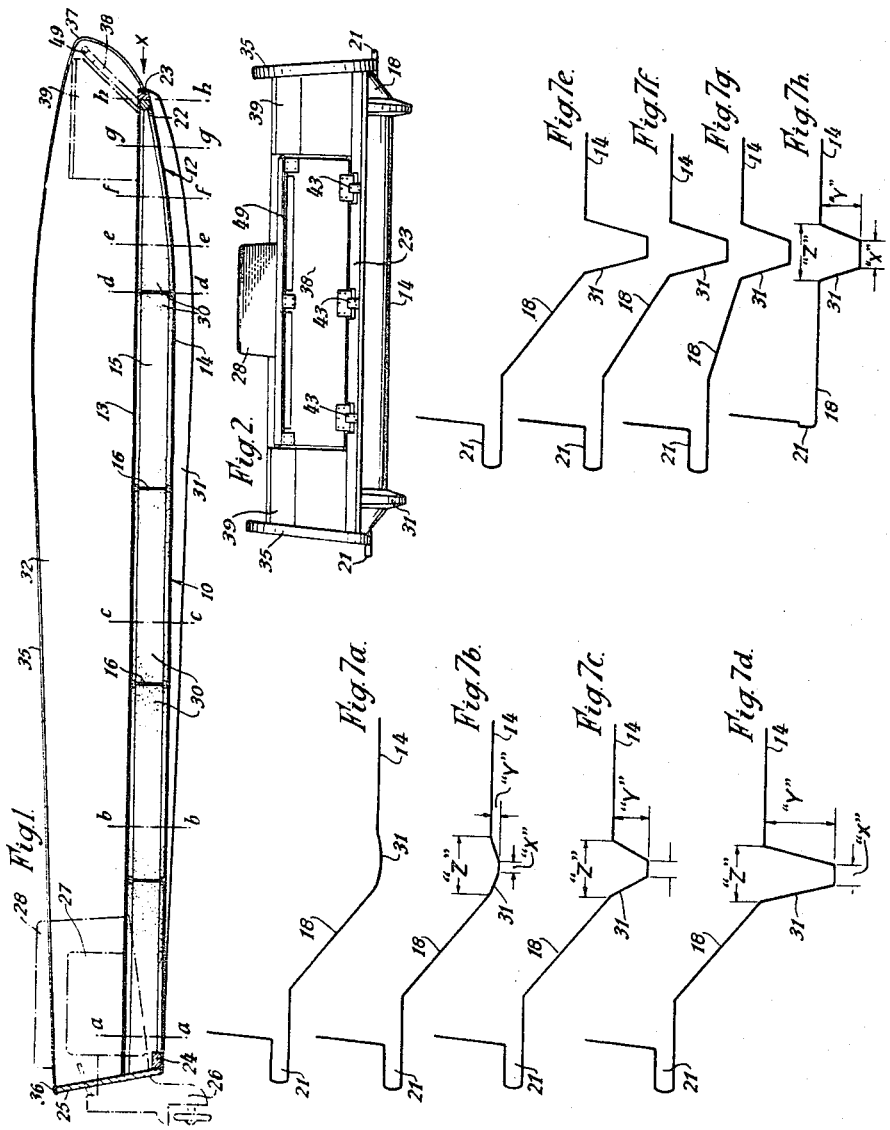
INVENTOR
JEREMY JOSEPH FRY
BY STEVENS, DAVIS, MILLER & MOSHER
ATTORNEYS

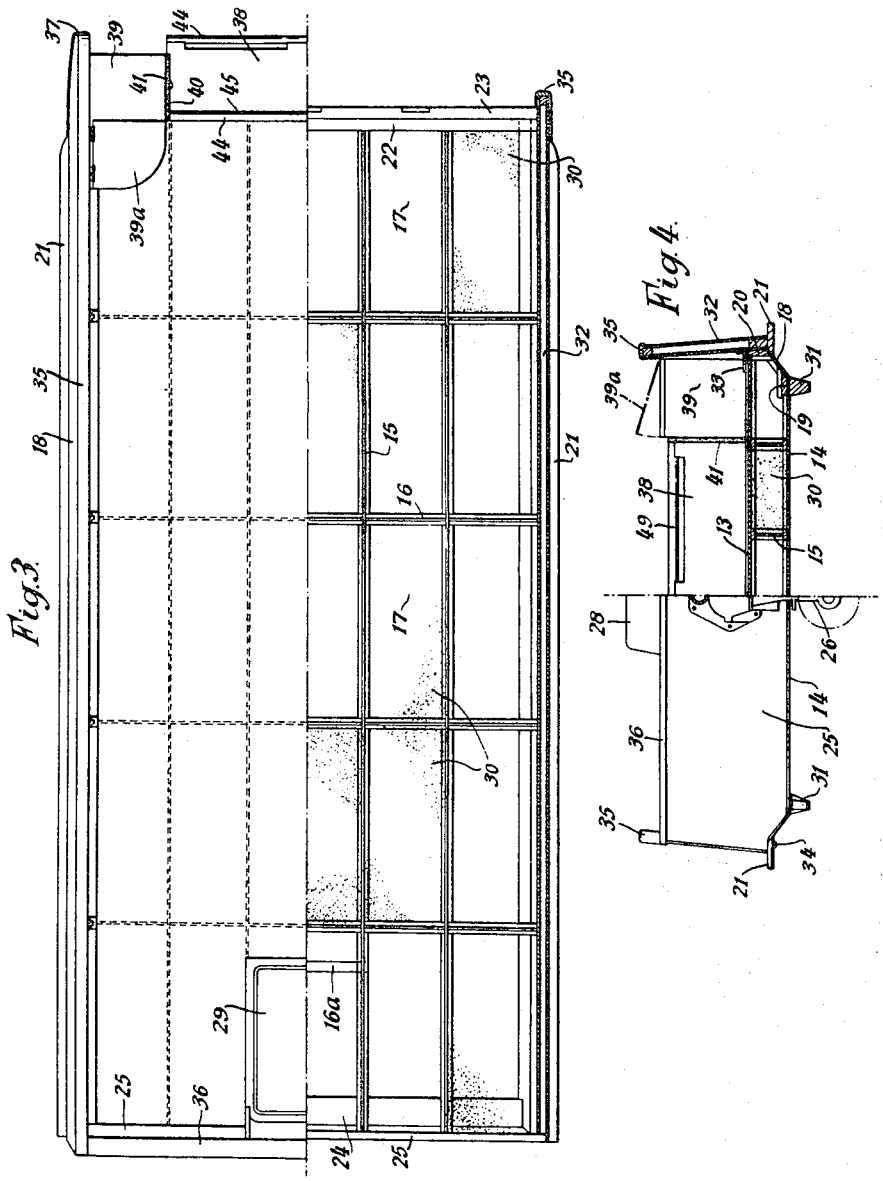

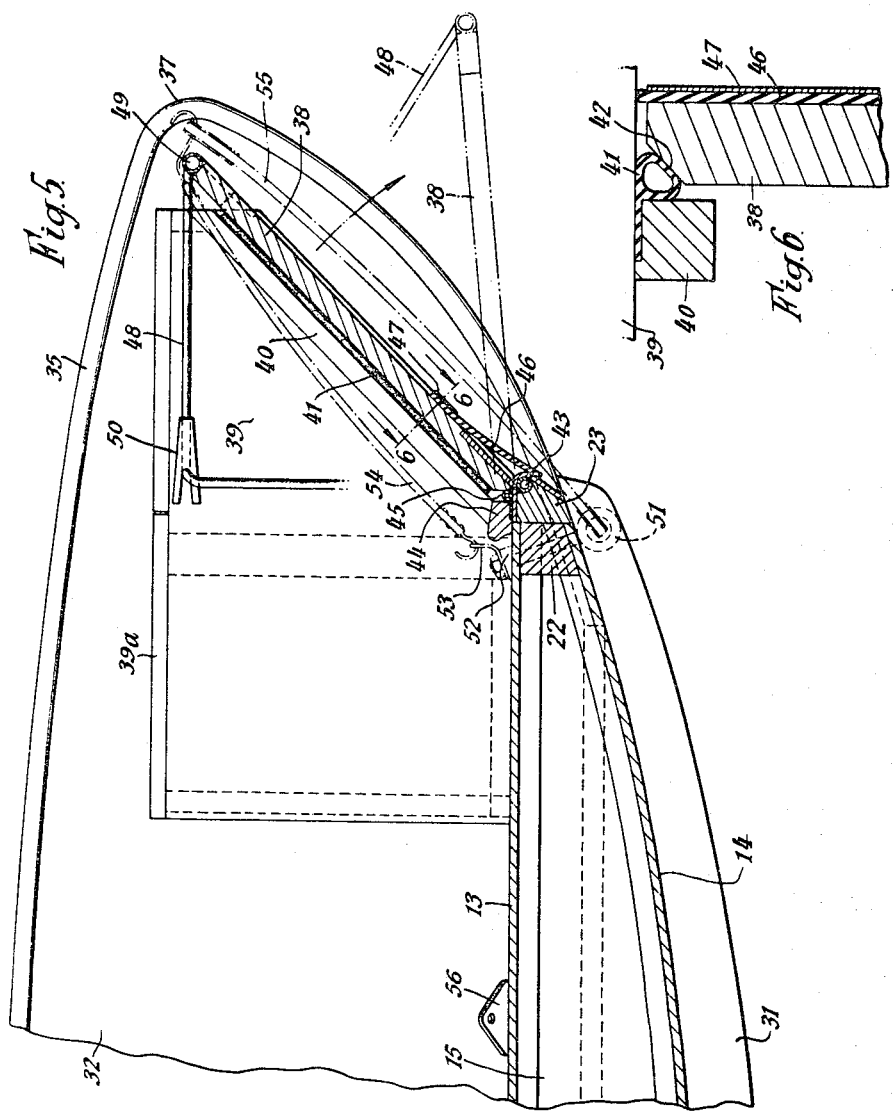

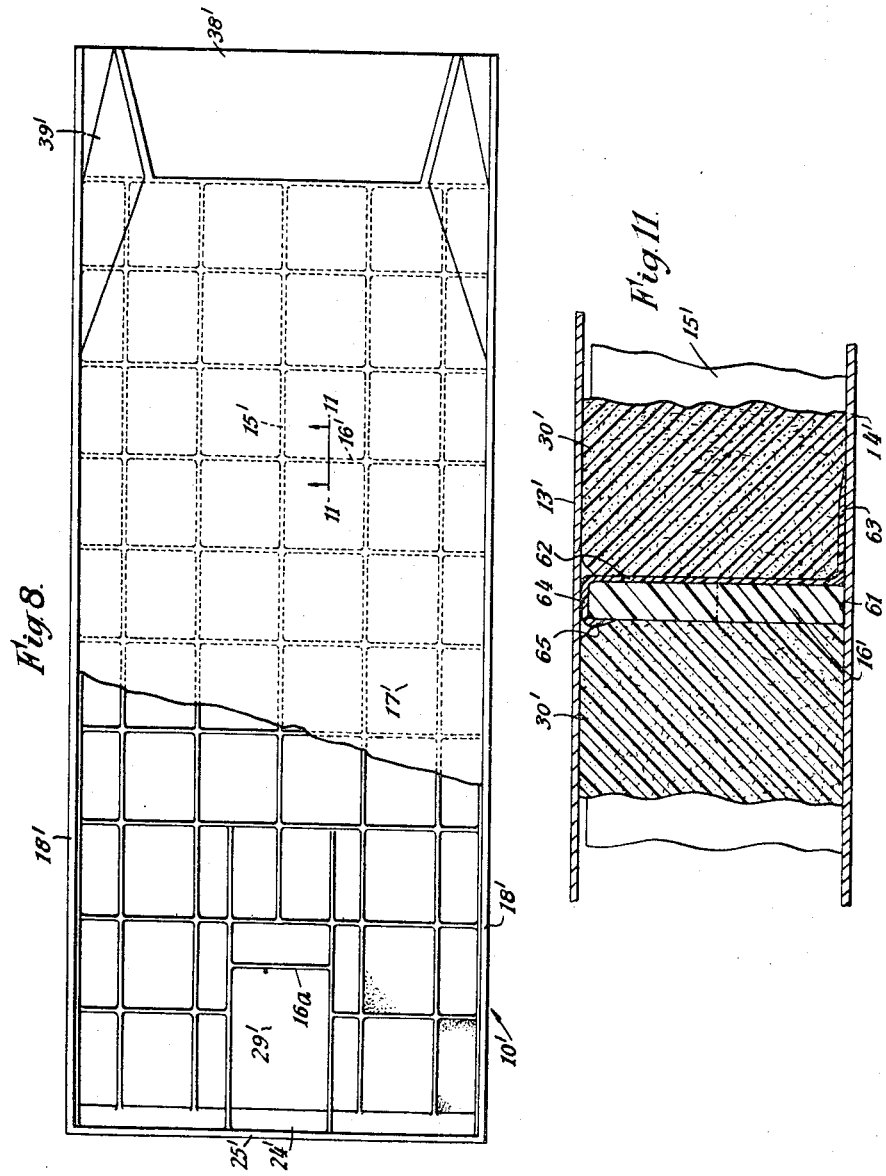

United States Patent Office 3,418,957
Patented Dec. 31, 1968

3,418,957
DESIGN AND CONSTRUCTION OF HULLS FOR MARINE CRAFT
Jeremy Joseph Fry, Bath, Somerset, England, assignor to Rotork Marine Limited, Bath, Somerset, England
Filed Dec. 21, 1966, Ser. No. 603,513
Claims priority, application Great Britain, Dec. 23, 1965, 54,599/65
5 Claims. (Cl. 114—66.5)

ABSTRACT OF THE DISCLOSURE

A hull for a marine craft is power propelled and comprises a flat rectangular body having a flat undersurface formed with a pair of spaced keel boards or like members depending therefrom. The keel boards are substantially parallel and positioned adjacent the sides of the hull. The boards have a maximum depth at the bow of the hull and reduce gradually in depth rearwardly to merge with the hull at a point near the position of rise of the hull from the water when planing.

---

This invention relates to the design and construction of hulls for marine craft, and as such is concerned more particularly, but not exclusively, with improvements in the design and construction of hulls for marine craft provided with some form of power propulsion.

The present thinking on the design and construction of hulls for power propelled marine craft appears to be concerned primarily with a reduction of drag in order to increase the forward speed of the craft for a given output of the power unit. Although changes in hull design to solve this problem may have reduced the drag and thereby improved the forward speed for a given output of the power unit, other more serious problems have resulted in that the load carrying capacity has been adversely affected and the stability, i.e., riding comfort more particularly in relation to slamming, pitching and rolling, is greatly reduced.

The present invention is therefore concerned with solving the above problems by an entirely new approach in the design and construction of the hull in which the stability and load carrying capacity are also greatly improved while increasing the performance of the craft for a given output of the power unit.

These improvements are basically obtained by forming the hull with a substantially flat bottom and in the preferred embodiment the hull appears as a substantially rectangular body having its lower surface suitably shaped from the stem of the craft so as to reduce the hydrodynamical resistance. According to the invention the efficiency of the flat bottom hull is improved when propelled forwardly by the power unit by providing a cushion of air beneath the hull. This cushion of air is provided without the use of mechanical means and is obtained by the forward movement of the hull when it reaches a certain speed. In a preferred arrangement air passing beneath the cutaway or turnup of the hull is trapped below the hull by providing a pair of spaced members depending from the hull and extending rearwardly from the bow of the hull. In one arrangement the spaced members are substantially parallel and are positioned closely adjacent the sides of the hull.

At the planing speed the efficiency of the hull is greatly increased in that a considerable improvement is obtained in the forward speed for a given output of the power unit due to the cushioning effect of the air which reduces the hydrodynamic drag caused by skin friction. In addition due to the flat construction of the hull its load carrying capacity is very greatly increased, while the ride is more comfortable due more particularly to a reduction in slamming, pitching and rolling.

The invention also provides a hull construction which is designed for lightness and its ability to float together with rigidity in torsion.

The invention will now be described by way of example with reference to the accompanying drawings, in which:

FIGURE 1 is a sectional side elevation of a hull in accordance with the invention and illustrating thereon a suitable superstructure, power assembly and ramp board;

FIGURE 2 is a front view of the complete craft as shown in FIGURE 1 showing in particular the construction of the ramp board and the positioning of the spaced keel boards;

FIGURE 3 is a plan view of the complete craft as shown in FIGURE 1, the part of the figure above the centre-line being a top plan, while the part of the figure below the centre-line is a sectional view on a line just below the deck level of the hull;

FIGURE 4 is an end elevation of the complete craft of FIGURE 1, the part of the figure to the right of the centre line being a sectional elevation;

FIGURE 5 is a sectional view on a greatly enlarged scale of the stem of the craft of FIGURE 1 showing in particular the mounting and construction of the ramp board;

FIGURE 6 is a sectional view on the line 6—6 of FIGURE 5 again to a greatly enlarged scale showing the seal between the ramp board and the adjacent stowage boxes of the superstructure;

FIGURE 7 is a series of diagrammatic illustrations from 7a to 7h taken respectively on the section lines a—a to h—h in FIGURE 1 to show the construction and shape of a keel board along the length of the hull;

FIGURE 8 is a plan view of a modified hull construction, the upper deck member being partly broken away to show the arrangement of longitudinal and cross stringers and the engine bay;

FIGURE 11 is a section through a cross stringer of the completed hull assembly on the line 11—11 of FIGURE 8 showing the connection of the upper and lower members and the filling of the cavities formed by the longitudinal and cross stringers.

Figure 9:
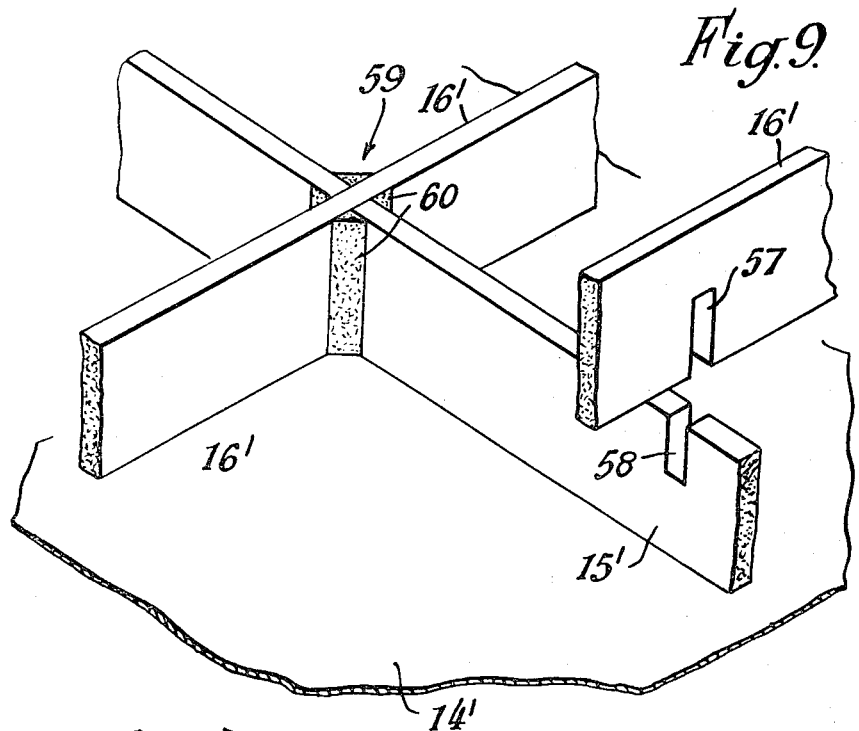
FIGURE 9 is a perspective view showing the assembly of the longitudinal and cross stringers for the hull assembly of FIGURE 8.

The invention is concerned primarily with the design and construction of a hull for a power propelled marine craft and in the following particular disclosure the hull will be described in detail as the basic concept of the invention. One adaptation of the hull in the production of a marine craft will also be described but it will be appreciated that many various structures may be built on the hull to suit individual requirements.

Referring now to the drawings and in particular to FIGURES 1 to 4, the hull 10 appears more or less as a substantially flat rectangular body, which is preferably, but not necessarily, shaped on its undersurface from the stem 11 to present a curved front 12 reducing hydrodynamic resistance during forward movement of the craft in the water.

The hull 10 comprises an upper flat member 13 and a spaced lower member 14 connected together by a plurality of longitudinal stringers 15 and cross stringers 16 so as to form a box-like construction providing a number of cavities 17 in the hull section (see FIGURE 3). The sides 18 of the hull are attached to the lower member 14 by longitudinal connecting members 19 and incline upwardly at an angle (see FIGURE 4) to connect with the upper member 13 by short vertical side members 20. The usual strake 21 extends outwardly horizontally from the hull 10 at the junction of the inclined and vertical side members 18, 20.

The stem 11 of the hull 10 is completed by a main front member 22 connecting the upper and lower members 13, 14 and into which the front ends of the longitudinal stringers 15 are jointed. A nose member 23 is screwed and glued to the main front member to cover all joints. The nose member 23 extends the full width of the hull and also hingedly supports the ramp board as will be hereinafter described more particularly with reference to FIGURES 5 and 6 of the drawings.

The hull 10 is completed at its stern by the usual transom 24 and by a transom board 25 which is suitably designed to permit the mounting therein of the outboard drive 26 of a power unit 27 (shown in FIGURES 1 and 4 in chain lines) which is located in a control cabinet 28 mounted in an engine bay 29 formed in the hull section 20 (see FIGURE 3) and supported at the front on cross member 16a and at the rear on transom 24.

As shown clearly in FIGURE 1 the hull is relatively thin in section, i.e., depth, and is designed for lightness and its ability to float together with rigidity in torsion. For example, the body of the hull may be made in plywood with all longitudinal and cross stringers, the transom and the strake in mahogany. All the cavities 17 in the hull section are foam filled with polyurethane 30 or equivalent and finally covered with a suitable skin structure.

The upper member 13 forms the deck member of the craft and an upper deck structure may be provided as will be hereinafter described.

As previously explained the efficiency, i.e., the forward speed of the hull 10 is greatly increased for a given output of the power unit 27, by providing a cushion of air beneath the flat or substantially flat undersurface of the hull as provided by the lower member 14. This cushion of air is trapped beneath the hull by providing a pair of spaced keel boards 31 which extend downwardly from the undersurface of member 14 at positions closely adjacent the start of the upwardly inclined side members 18 (see FIGURES 2 and 4). The spaced keel boards 31 are preferably parallel as shown but they may be located to converge inwardly towards each other as they extend towards the stern of the hull for at least a portion of their length along the undersurface of the member 14 of the hull.

The keel members 31 each vary in their shape and size along the length of the hull as will be explained with reference to FIGURE 7 of the drawings. Briefly, the keel members 31 have their maximum depth at a position at or closely adjacent the bow of the hull and they gradually reduce in depth to merge with the undersurface of the hull at a point near the position of rise of the hull from the water when the craft is planing. The function of the spaced keel members 31 is to trap air passing beneath the turnup or cutaway of the hull formed by the curved portion 12 and to funnel this air beneath the hull to provide a cushion of air or aerated water beneath the rest of the hull. In this way the drag or hydrodynamic resistance due to skin friction is considerably reduced and a greater forward speed is obtained for a given output of the power unit 27.

FIGURE 7 illustrates one possible construction of a keel board which is shown diagrammatically by a series of FIGURES 7a to 7h which are sections through the keel board and lower part of the hull section as indicated by the corresponding section lines a—a to h—h in FIGURE 1.

In one particular embodiment in accordance with the invention, given by way of example only, the length of the hull structure from the transom board to the stem is approximately 20 feet, while the width of the hull (excluding the strakes 21) is approximately 9 ft. 2 in. with the distance between the keel members approximately 8 ft. The depth of the hull, i.e., the distance between the members 13 and 14 is approximately 9 in.

Each keel board 31 has a width at its lower end which is indicated in FIGURES 7a to 7h by the dimension X and a depth indicated by the dimension Y. The values are tabulated as follows:

| Figure | Distance from transom board (ft.) | Width of keel board X (inches) | Depth of keel board Y (inches) |
|---|---|---|---|
| 7a | 0.3 | (¹) | ¼ |
| 7b | 5.0 | ⅝ | ⅝ |
| 7c | 10.0 | ⅞ | 2 |
| 7d | 16.0 | 1 | 4 |
| 7e | 17.0 | 1 1/16 | 3½ |
| 7f | 18.0 | 1⅛ | 3¼ |
| 7g | 19.0 | 1¼ | 2¾ |
| 7h | 20.0 | 1½ | 2¼ |

¹ Slight curve.

The width of the keel board at its upper end at its junction with the lower member 14 is indicated by the dimension Z and in the example given above remains constant throughout its length at 3 inches.

Due to the flat construction of the hull the load carrying capacity of the craft is also very greatly increased, e.g., about four times that of a hull of conventional shape and with a comparable overall length. A more comfortable ride is also obtained as the usual slamming of conventional power boats is avoided when the craft is planing. Finally, the stability of the craft is also improved, due more particularly to a reduction in pitching and rolling.

As previously mentioned, a suitable structure can be built up on to the flat body of the hull to provide a suitable marine craft. Due to its exceptional load carrying ability the hull can be designed completely or partially to carry equipment, such as road vehicles, and as such the hull is particularly applicable for drive-on conditions at the waters edge due to its shallow draught.

The embodiment shown in the drawings has a deck structure which comprises side frames 32 shown more clearly in FIGURE 4. The side frames 32 are connected to side members 20 and to deck member 13 by brackets 33. The strakes 21 are bolted to the lower end of the side frames by spaced bolts 34. Each side frame 32 is completed by a handrail 35 which extends longitudinally thereof and abuts a similar handrail 36 on the top of the transom board 25. At the stem of the craft the side frames are suitably shaped to form prow portions 37, the prow portions being suitably curved as shown in FIGURE 5 so as to provide side protection and support for a ramp board 38 hingedly mounted therebetween on nose member 23.

Each prow portion 37 of the side frames 32 is formed with stowage boxes 39 extending inwardly therefrom at the front of the hull of the craft. As shown more clearly in FIGURE 5 the stowage boxes are provided with a top closure member 39a and the forward portion of each stowage box is inclined to conform to the position of the ramp board 38 when raised between the boxes as shown in full lines.

Each stowage box has a butt strip 40 mounted thereon (see FIGURE 6) and which incorporates a sealing member 41 for engagement by the abutting chamfered edge 42 of the ramp board when raised.

A plurality, for example, three hinge members 43 (see FIGURE 2) are mounted on the ramp board and attached to the nose member 23 along its length. A handrail 44 extends along the front of the hull between the stowage boxes and includes a sealing member 45 engageable by the lower inner edge of the ramp board when in its raised position. The ramp board is completed by a rubberised antispray strip 46 which runs the full width of the board and is clamped thereon by a galvanised strip 47, The lower free end of the strip abutting the nose member 23 (see FIGURE 5). The ramp board is retained in its raised position by a suitable cable 48 connected to top rail 49 and engageable in a jamming cleat 50. The lowered position of the ramp board is shown in chain lines in FIGURE 5.

A mooring arrangement may be provided as shown in chain lines in FIGURE 5 and which comprises a mooring eyebolt 51 which is fixed through the main front member 22 with a wedge washer 52 on top and an eye plate 53 to attach a shock cord 54 which extends over rail 49 to engage and hold a stainless steel mooring lash 55 which is spliced and eyeletted permanently to the eyebolt 51.

The hull is provided with spaced lifting lugs 56 one of which is shown in FIGURE 5.

A modified and preferred layout and construction of the hull assembly is shown in FIGURES 8 to 11 of the drawings. In these figures similar parts are given the same reference numerals with the addition of a prime mark.

FIGURE 9 shows the construction and assembly of the longitudinal stringers 15' with the cross stringers 16'. Each stringer is formed with interlocking slots 57, 58 respectively which fit together throughout the length and width of the hull assembly 10'. The stringers are made of spandofoam sheet and are cut as required. Preferably the central area of the cross stringers is of greater depth so as to provide a deck area sloping gently to the sides of the craft. Similarly a greater depth can be provided at the front of the hull to give increased strength.

The junction 59 of two interlocking sections 15', 16' of the spandofoam is first provided with fillets 60 of foam or like materials to reduce the angles of the corners. The whole assembly is then mounted on the lower member 14' of the hull 10' by bonding the strips 15', 16' thereto using, e.g., polystyrene, as shown at 61 in FIGURE 11.

Figure 10:
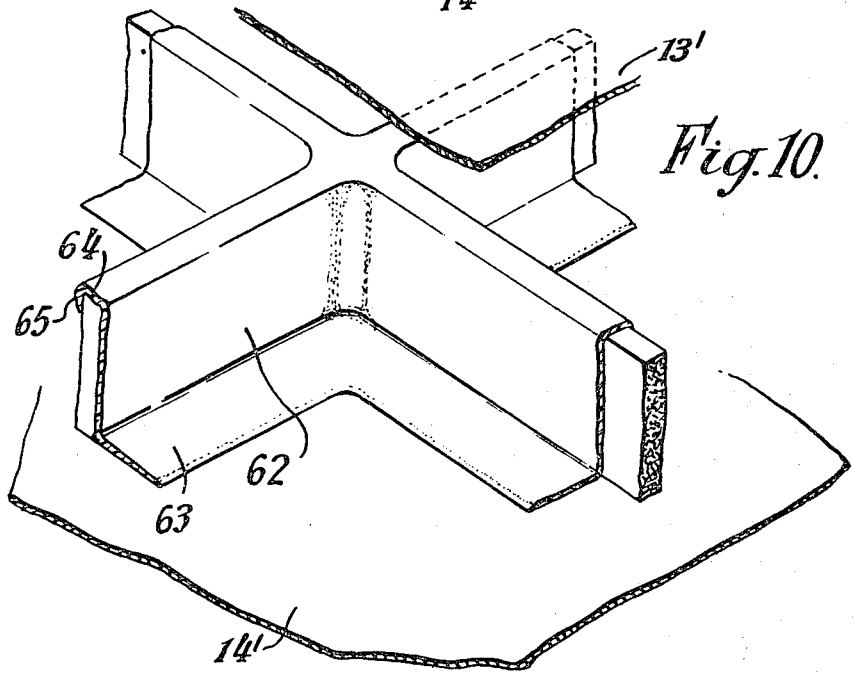
FIGURE 10 is a perspective view of the assembled longitudinal and cross stringers showing the mounting of the overlay thereon.

The interlocking members 15', 16' form cores which are now covered with a metal overlay 62 bent into Z-form as shown in FIGURES 10 and 11. The metal overlay 62 abuts the side of the core members 15' or 16' and its bottom flange 63 fits against the lower member 14' while its upper flange 64 fits over the top of the core and has its end portion 65 bent over. The cavities 17' between the stringers is then filled in situ with foamed material 30' which is levelled off as shown so that the upper deck member 13' engages intimately with the top flanges 64 of the overlays 62.

As previously mentioned, any suitable structure can be built on to the flat body of the hull to provide a suitable craft. For example, cabin structures can be provided and the power unit can be positioned fore or aft of the hull. The hull has exceptional load carrying ability and can be designed completely for loading at the water's edge due to its shallow draught. To facilitate such an operation the undersurface at the stem of the hull may be provided with runners.

It will be appreciated that the invention provides a more efficient and greatly improved design and construction of a hull for a marine craft. Not only is the efficiency, i.e., forward speed, improved by reducing the drag, but its load carrying capacity is greatly increased together with its stability so that a more comfortable ride is obtained due particularly to the resulting reduction in slamming, pitching and rolling of the craft.

I claim:
1. A hull for marine craft having a substantially flat and substantially rectangular undersurface, said hull having a depth which is relatively small compared with the length and width thereof, a pair of spaced substantially parallel keel boards depending from the underside of said hull closely adjacent the sides thereof, said keel boards having a maximum depth at the bow and extending towards the stern with gradually reducing depth to merge with the hull at a point near the position of rise of the hull from the water when planing, said undersurface being curved upwardly at the stem to provide a cutaway so that air passing thereunder is trapped below the hull between the spaced keel boards, a plurality of longitudinal and cross stringers assembled to form cavities therebetween, foam material substantially filling said cavities, top and bottom members attached to said stringers, side members connected to and inclined outwardly from said bottom member and connecting with said top member, strakes attached to said side frames and extending outwardly from the sides of said hull, and power propulsion means mounted in said hull.

2. A hull according to claim 1 further comprising a ramp board movably mounted at the stem for bow loading of said hull.

3. A hull according to claim 1 in which said plurality of longitudinal and cross stringers are formed by core members having interlocking slots.

4. A hull according to claim 3 in which said core members are formed of spandofoam and are mounted on said bottom member, each said core member having an overlay comprising a lower flange engaging said bottom member and a top flange engaging over said core.

5. A hull according to claim 1 further comprising a superstructure mounted on said top member.

References Cited

UNITED STATES PATENTS

| | | | |
|---|---|---|---|
| 229,000 | 6/1880 | Kellogg | 114—63 |
| 1,514,695 | 11/1924 | Grenier | 114—66.5 |
| 2,341,866 | 2/1944 | Higgins | 114—70 |
| 2,721,341 | 10/1955 | Roberts et al. | 9—6 |
| 2,744,042 | 5/1956 | Pace | 9—6 XR |

ANDREW H. FARRELL, *Primary Examiner.*

U.S. Cl. X.R.

114—63